(12) United States Patent
Hejda et al.

(10) Patent No.: US 12,175,810 B2
(45) Date of Patent: Dec. 24, 2024

(54) METHOD, FAULT MANAGEMENT APPARATUS, COMPUTER PROGRAM, AND COMPUTER PROGRAM PRODUCT FOR FAULT MANAGEMENT FOR A VEHICLE

(71) Applicant: Bayerische Motoren Werke Aktiengesellschaft, Munich (DE)

(72) Inventors: Tomas Hejda, Neufahrn (DE); Peter Radojkovic, Munich (DE); Johannes Waldthausen, Penzing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 313 days.

(21) Appl. No.: 17/614,318

(22) PCT Filed: May 29, 2020

(86) PCT No.: PCT/EP2020/065031
§ 371 (c)(1),
(2) Date: Nov. 24, 2021

(87) PCT Pub. No.: WO2021/001097
PCT Pub. Date: Jan. 7, 2021

(65) Prior Publication Data
US 2022/0230484 A1    Jul. 21, 2022

(30) Foreign Application Priority Data

Jul. 3, 2019    (DE) .................... 10 2019 117 943.2

(51) Int. Cl.
*G07C 5/08*    (2006.01)
*H04N 7/18*    (2006.01)
(52) U.S. Cl.
CPC ........... *G07C 5/0808* (2013.01); *H04N 7/181* (2013.01)

(58) Field of Classification Search
CPC ..... G07C 5/0808; G07C 5/0816; H04N 7/181
See application file for complete search history.

(56) References Cited

U.S. PATENT DOCUMENTS 9,679,424 B2    6/2017 Plante et al.
2008/0147266 A1    6/2008 Plante et al.
(Continued)

FOREIGN PATENT DOCUMENTS

CN    105023318 A    11/2015
DE    102013213872 A1    2/2015
(Continued)

OTHER PUBLICATIONS

International Search Report corresponding to International Patent Application No. PCT/EP2020/065031, dated Sep. 17, 2020 (5 pages).
(Continued)

*Primary Examiner* — Tyler J Lee
*Assistant Examiner* — Yufeng Zhang
(74) *Attorney, Agent, or Firm* — Maginot, Moore & Beck LLP (57) ABSTRACT

A method, apparatus and computer software for fault management for a vehicle having at least one camera unit configured to provide image data includes a step of, responsive to detection of a respective fault condition in relation to the vehicle, creating a respective fault entry which is representative of information relating to the respective detected fault condition. Respective image data of the at least one camera unit is requested depending on the respective detected fault condition in such a way that the respective image data has a temporal reference to the respective detected fault condition. The respective requested image data is assigned to the respective fault entry.

19 Claims, 4 Drawing Sheets

(56) References Cited

U.S. PATENT DOCUMENTS

| | | | |
|---|---|---|---|
| 2010/0228423 A1 | 9/2010 | Howell et al. | |
| 2016/0063775 A1* | 3/2016 | Plante .................. | G07C 5/0858 |
| | | | 701/32.2 |
| 2017/0177287 A1* | 6/2017 | Jeong ..................... | H04N 7/181 |

FOREIGN PATENT DOCUMENTS

| | | |
|---|---|---|
| DE | 102014208638 A1 | 11/2015 |
| DE | 102017219232 A1 | 5/2019 |
| DE | 102018008683 A1 | 5/2019 |
| EP | 2166514 A2 | 3/2010 |
| EP | 3270575 A1 | 1/2018 |

OTHER PUBLICATIONS

German Search Report corresponding to German Patent Application No. 10 2019 117 943.2, dated Jun. 18, 2020 (7 bages).

\* cited by examiner

METHOD, FAULT MANAGEMENT APPARATUS, COMPUTER PROGRAM, AND COMPUTER PROGRAM PRODUCT FOR FAULT MANAGEMENT FOR A VEHICLE

The present application is the U.S. national phase of PCT Application PCT/EP2020/065031 filed on May 29, 2020, which claims priority of German patent application No. 102019117943.2 filed on Jul. 3, 2019, which is incorporated herein by reference in its entirety.

TECHNICAL FIELD

The disclosure relates to a method for fault management for a vehicle, a fault management apparatus for a vehicle, and a computer program and computer program product for fault management for a vehicle.

BACKGROUND

Faults can occur in vehicles. If a fault is detected, it can be processed by a fault management apparatus.

One underlying object of the disclosed embodiments is to make a contribution to a precise fault management for a vehicle.

SUMMARY

The object is achieved by the features of the independent patent claims. Advantageous designs are set out in the subclaims.

A first aspect is a method for fault management for a vehicle.

The vehicle has at least one camera unit which is designed to provide image data.

According to the first aspect, if a respective fault condition is detected in relation to the vehicle, a respective fault entry is created depending on the respective detected fault condition. The respective fault entry is representative of information relating to the respective detected fault condition. Respective image data of the at least one camera unit are requested depending on the respective detected fault condition. The image data of the at least one camera unit are requested in such a way that the respective image data have a temporal reference to the respective detected fault condition. The respective requested image data are assigned to the respective fault entry.

As a result, it is possible to use the respective requested image data as additional information for the respective fault entry by means of existing infrastructure of the vehicle. This is advantageous, for example, for an assessment of a fault cause of the respective detected fault condition. An unequivocal assessment, for example, of the fault cause of the respective fault condition can thereby be enabled. This simplifies, for example, an analysis of a problem and/or can result in a cost reduction.

Problem elimination and/or system optimization, for example, can thus be simplified for the vehicle. Vehicle safety, for example, can furthermore be increased as a result if the fault cause can be unequivocally assigned to the respective detected fault condition by means of the additional information in the form of the respective requested image data. An unequivocal misuse by a user and/or of a driver of the vehicle, for example, can thus be established, such as, for example, an impairment of a field of view of a camera unit of the vehicle through the use of a cell phone. The respective requested image data assigned to the respective fault entry can, for example, be read together with the respective fault entry in the event of a service and/or an inspection in a workshop or the like in order, for example, to simplify the problem elimination and/or assessment of the fault cause of the respective detected fault condition and/or a resolution of the fault cause and/or a clarification of the repair costs. The respective requested image data assigned to the respective fault entry can, for example, also be advantageously used even during the development of the vehicle.

The at least one camera unit is, for example, a camera and/or an infrared camera or the like. The at least one camera unit is arranged, for example, in an internal area and/or external area of the vehicle. The at least one camera unit is designed, for example, for facial recognition of the driver of the vehicle. The at least one camera unit is designed, for example, to provide the image data via a bus system or a network connection of the vehicle. The bus system is, for example, a controller area network, CAN, bus system. In particular, the network connection is designed, for example, as a wireless or an optical network connection.

The respective fault condition is, for example, a fault condition of any vehicle function of the vehicle. The respective fault condition is, for example, a defect of an electronic window regulator of the vehicle and/or a fault in the facial recognition of the driver of the vehicle and/or a defect of a trailer hitch of the vehicle and/or a defect in an area around the vehicle or the like.

The respective fault condition is detected, for example, for a respective occurrence of the defect of the electronic window regulator of the vehicle.

The respective fault entry comprises, for example, information in text form, such as a time indication and/or a vehicle condition and/or further information. The information in text form comprises, in particular, letters and/or numbers and/or any characters or the like. In particular, the respective fault entry is, for example, a fault memory entry of the vehicle. If necessary, the respective fault entry is free from respective image data.

The temporal reference of the respective image data to the respective detected fault condition comprises, for example, a predefined time range around a time of the detection of the respective fault condition. The temporal reference also comprises, for example, the time of detection of the respective fault condition.

The respective image data of the at least one camera unit are requested, for example, for the predefined time range and/or a predefined time. The predefined time range and/or the predefined time is/are dependent, for example, on a type of the respective fault condition. In particular, the predefined time range and/or the predefined time is/are predefined, for example, by a user input. The requested image data provide, for example, findings relating to the assessment of the fault cause of the respective detected fault condition.

The respective image data are requested for the predefined time, for example, in such a way that the predefined time occurs, in particular, before the time of detection of the respective fault condition. The respective image data are requested for the predefined time, for example, in such a way that the predefined time occurs, in particular, after the time of detection of the respective fault condition. The respective image data are requested for the predefined time, for example, in such a way that the predefined time corresponds, in particular, to the time of detection of the respective fault condition.

The assignment of the respective requested image data to the respective fault entry is performed, for example, on the basis of a name and/or component information and/or a code or the like. The assignment can be performed, for example, chronologically or time-independently.

According to one optional design, the respective image data of the at least one camera unit are requested from an image data buffer memory depending on the respective detected fault condition. The image data buffer memory has pre-stored image data of the at least one camera unit.

As a result, it is possible to use pre-stored image data of the existing infrastructure of the vehicle for the assignment.

The image data of the at least one camera unit are temporarily stored, for example, in the image data buffer memory for different time ranges. This can be the case if the latter are already used by vehicle functions of the vehicle. The different times have, for example, the predefined time range and/or the predefined time and can therefore be used for the assignment.

The image data buffer memory is, for example, a central data memory of the vehicle. The image data buffer memory is, for example, a local data memory which is arranged, for example, in a structural unit with the at least one camera unit.

According to a further optional design, the respective image data of the at least one camera unit are requested from the at least one camera unit depending on the respective detected fault condition.

As a result, it is possible to request the respective image data directly from the at least one camera unit.

The image data are requested from the at least one camera unit, for example, by requesting image data for the predefined time range and/or the predefined time. The at least one camera unit is activated, if necessary, for example, to generate the requested image data.

According to one further optional design, the respective fault entry is stored in a fault entry memory.

As a result, it is possible to use the existing infrastructure of the vehicle to store the respective fault entry. Furthermore, the respective fault entry can thus be stored independently from the requested image data.

In particular, the fault entry memory is, for example, a fault memory of the vehicle which is designed to store a fault memory entry.

However, the fault entry memory can also be arranged, for example, outside the vehicle.

According to one further optional design, the respective requested image data of the at least one camera unit are stored in an image data memory.

As a result, it is possible to use the existing infrastructure of the vehicle to store the respective requested image data. Furthermore, the respective requested image data can thus be stored independently from the respective fault entry.

The image data memory is, for example, the central data memory of the vehicle. The image data memory corresponds, for example, to the fault entry memory.

However, the image data memory can also be arranged, for example, outside the vehicle.

According to one further optional design, the vehicle comprises a plurality of camera units. A subset of the plurality of camera units is selected depending on the respective detected fault condition. Respective image data of the subset of the plurality of camera units are requested depending on the respective detected fault condition. The respective image data of the subset of the plurality of camera units are requested in such a way that the respective image data have a temporal reference to the respective detected fault condition.

As a result, it is possible to request the image data depending on the respective detected fault condition. Furthermore, it is thus possible to request the image data depending on a type and/or a location of the respective detected fault condition.

The subset is predefined, for example, by a user input. The subset is, for example, determined automatically. The subset is, for example, dependent on the respective detected fault condition.

The plurality of camera units are installed, for example, in different areas of the vehicle. The image data of the subset of the plurality of camera units have, for example, a correlation to the respective detected fault condition.

A second aspect is a fault management apparatus for a vehicle which has at least one camera unit which is designed to provide image data. The fault management apparatus has a fault entry memory which is designed to store a respective fault entry. The fault management apparatus further has an image data memory which is designed to store respective requested image data. The fault management apparatus is designed to carry out the method for fault management for a vehicle.

The fault management apparatus is arranged, for example, in a structural unit in the vehicle.

The fault management apparatus is arranged, for example, in different structural units. The fault management apparatus comprises, for example, a first partial fault management apparatus and a second partial fault management apparatus. The first partial fault management apparatus comprises, for example, a first communication interface. The second partial fault management apparatus comprises, for example, a second communication interface. The first communication interface is designed, for example, to receive data from the second communication interface. The second communication interface is designed, for example, to receive data from the first communication interface. The first partial fault management apparatus is arranged, for example, in the vehicle, and the second partial fault management apparatus is arranged outside the vehicle. In particular, the second partial fault management apparatus is arranged, for example, in a backend or cloud or the like outside the vehicle. The data comprise, for example, the respective fault entry and/or the respective requested image data.

The first communication interface and the second communication interface are interconnected, for example, via a network connection.

The first partial fault management apparatus comprises, for example, the fault entry memory, and the second partial fault management apparatus comprises the image data memory, or vice versa. The second partial fault management apparatus comprises, for example, the fault entry memory and the image memory.

A further aspect is a computer program, wherein the computer program comprises instructions which, when the computer program is executed by a computer, cause the computer to carry out the method for fault management for a vehicle during its execution on a data processing apparatus.

Yet a further aspect is a computer program product comprising an executable program code, wherein the program code, when it is executed by a data processing apparatus, carries out the method for fault management for a vehicle.

The computer program product comprises, in particular, a medium readable by the data processing apparatus on which the program code is stored.

BRIEF DESCRIPTION OF THE DRAWINGS

Exemplary embodiments are explained in detail below with reference to the schematic drawings, in which.

DETAILED DESCRIPTION

Figure 1:
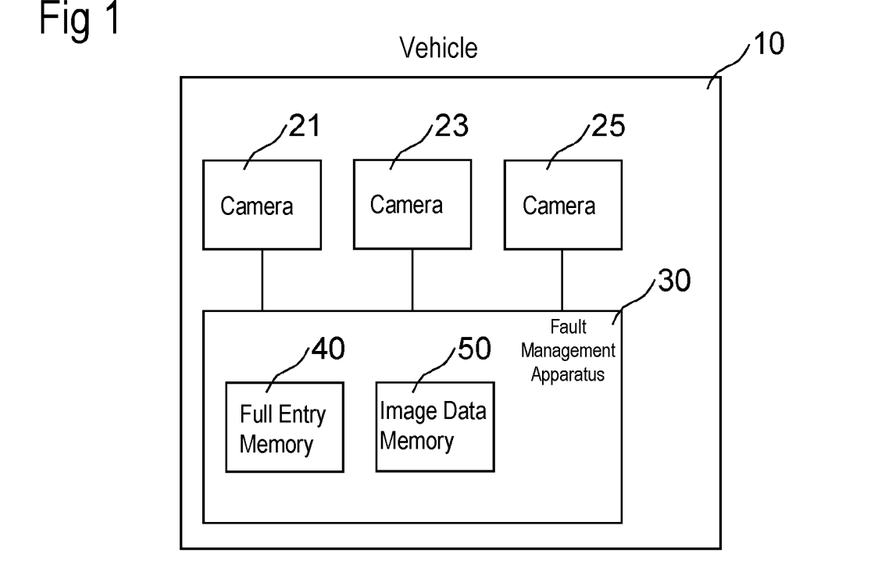
FIG. 1 shows a schematic drawing of a vehicle.

FIG. 1 shows a schematic drawing of a vehicle 10. The vehicle 10 has a plurality of camera units 21, 23, 25 which are designed to provide image data. The vehicle 10 further has a fault management apparatus 30 which is designed to request image data from the plurality of camera units 21, 23, 25. The fault management apparatus 30 has a fault entry memory 40 which is designed to store a respective fault entry FE. The fault management apparatus 30 further has an image data memory 50 which is designed to store the respective requested image data ABD.

The plurality of camera units 21, 23, 25 and the fault management apparatus 30 are interconnected, for example, via a bus system or network connection of the vehicle. The bus system is, for example, a controller area network, CAN, bus system. The network connection is, in particular, for example, a wireless or an optical network connection.

The plurality of camera units 21, 23, 25 can also comprise, for example, more than three camera units.

Figure 2:
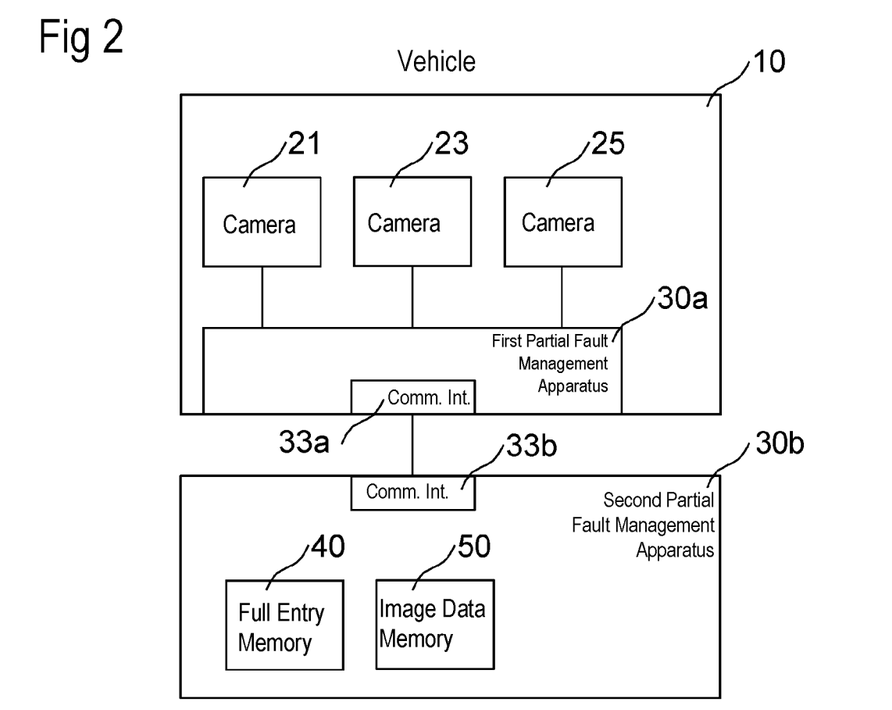
FIG. 2 shows a schematic drawing of a first distributed system.

FIG. 2 shows a schematic drawing of a first distributed system. The first distributed system has the vehicle 10. The vehicle 10 has the plurality of camera units 21, 23, 25. The vehicle 10 further has a first partial fault management apparatus 30a. The first partial fault management apparatus 30a has a first communication interface 33a. The distributed system further has a second partial fault management apparatus 30b which is arranged outside the vehicle 10. In particular, the second partial fault management apparatus 30b is arranged, for example, in a backend or cloud or the like outside the vehicle. The second partial fault management apparatus 30b has a second communication interface 33b. The second partial fault management apparatus 30b comprises the fault management memory 40. The second partial fault management apparatus 30b further comprises the image data memory 50.

The second communication interface 33b is designed, for example, to receive the respective fault entry FE and/or the respective requested image data ABD from the first communication interface 33a.

The first communication interface 33a and the second communication interface 33b are interconnected, for example, via a network connection.

Figure 3:
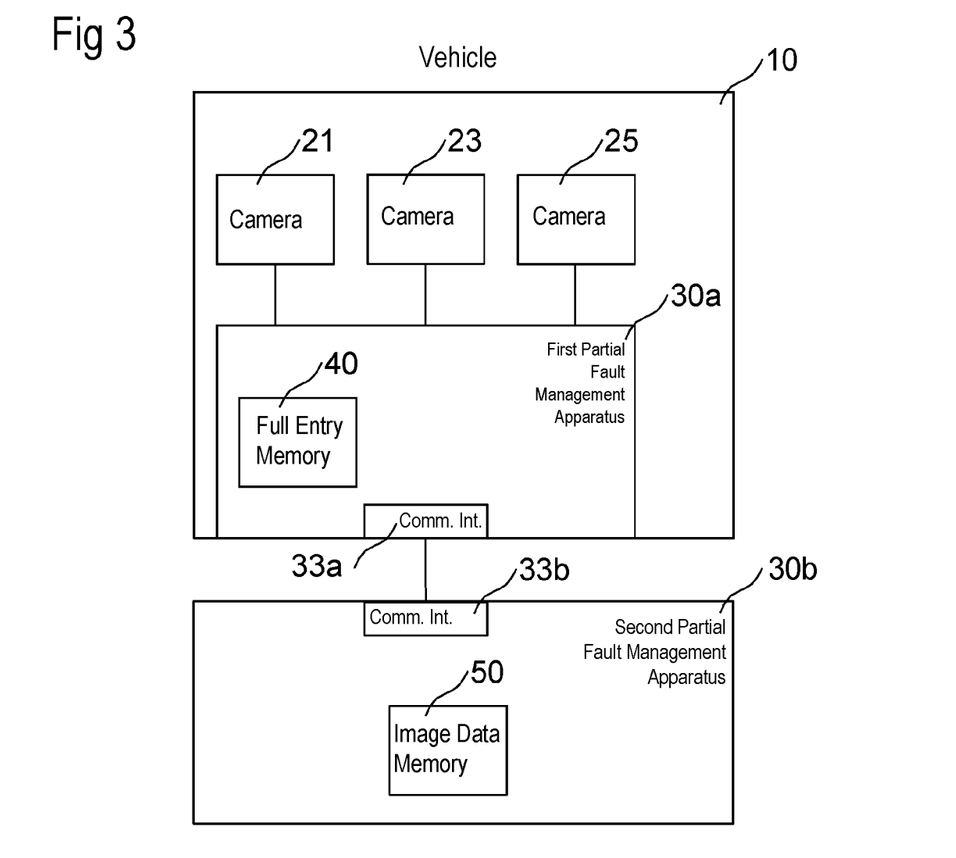
FIG. 3 shows a schematic drawing of a second distributed system.

FIG. 3 shows a schematic drawing of a second distributed system. The second distributed system has the same features as the first distributed system, wherein the first partial fault management apparatus 30a comprises the fault entry memory 40, and the second partial fault management apparatus 30b comprises the image data memory 50.

Figure 4:
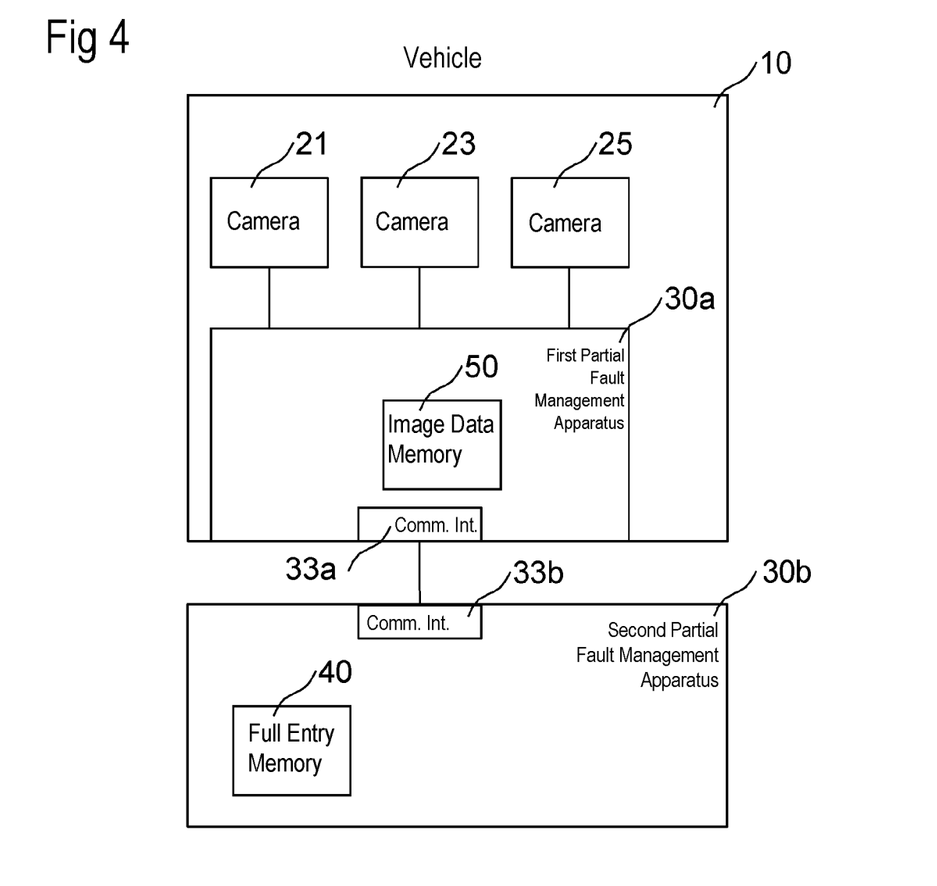
FIG. 4 shows a schematic drawing of a third distributed system.

FIG. 4 shows a schematic drawing of a third distributed system. The third distributed system has the same features as the first distributed system, wherein the first partial fault apparatus 30a comprises the image data memory 50, and the second partial fault management apparatus 30b comprises the fault entry memory 40.

Figure 5:
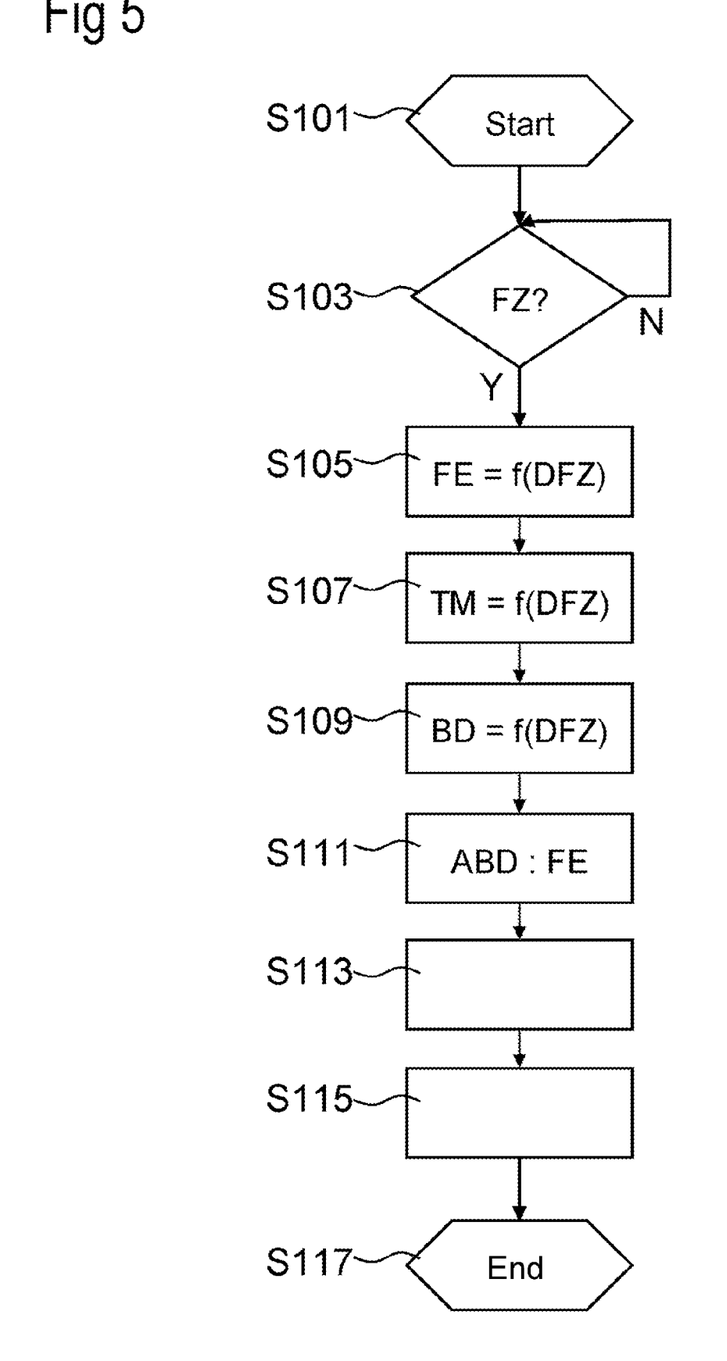
FIG. 5 shows a flow diagram of a program for fault management for a vehicle.

FIG. 5 shows a flow diagram of a program for fault management for the vehicle 10, wherein the program is stored in a program memory and/or data memory and can be executed by a computing unit. The fault management apparatus 30 for the vehicle 10 comprises, for example, the program memory and/or data memory and the computing unit which executes the program for processing measurement datasets.

The program is started in a step S101 in which, if necessary, variables are initialized.

The program is continued in a step S103. In step S103, it is determined whether a respective fault condition FZ is detected in relation to the vehicle 10. If a respective fault condition FZ is detected in relation to the vehicle 10, the processing is continued in a step S105. Otherwise, the processing is continued once more in step S103, if necessary following a predefined waiting time period.

The respective fault condition is, for example, a fault in a facial recognition of a driver of the vehicle.

In step S105, a respective fault entry FE is created depending on the respective detected fault condition DFZ. The respective fault entry FE is representative of information relating to the respective detected fault condition DFZ.

In particular, the respective fault entry is, for example, a fault memory entry of the vehicle which is representative of the fault in the facial recognition.

Following step S105, the program is continued in a step S107. In step S107, a subset TM of the plurality of camera units 21, 23, 25 is selected depending on the respective detected fault condition DFZ.

The camera unit 21 is, for example, an internal area camera which is installed on a rearview mirror of the vehicle, wherein its field of view comprises a driver's seat of the vehicle. The camera unit 23 is, for example, a further internal area camera whose field of view comprises the driver's seat of the vehicle. The camera unit 21 is, for example, an internal area camera whose field of view does not comprise the driver's seat of the vehicle.

The subset TM is predefined, for example, by a user input for faults in the facial recognition in such a way that the subset TM comprises the camera units 21, 23.

Following step S107, the program is continued in a step S109. In step S109, respective image data BD of the subset TM of the plurality of camera units 21, 23, 25 are requested depending on the respective detected fault condition DFZ. The image data BD of the subset TM of the plurality of camera units 21, 23, 25 are requested in such a way that the respective image data BD have a temporal reference to the respective detected fault condition DFZ.

Optionally, in step S109, the respective image data BD of the subset TM of the plurality of camera units 21, 23, 25 are requested from an image data buffer memory depending on the respective detected fault condition DFZ. The image data buffer memory has pre-stored image data of the subset TM of the plurality of camera units 21, 23, 25.

Optionally, in step S109, the respective image data BD of the subset TM of the plurality of camera units 21, 23, 25 are requested from the subset TM of the plurality of camera units 21, 23, 25 depending on the respective detected fault condition DFZ.

The respective image data BD of the subset TM which comprises the camera units 21, 23 are requested, for example, for the fault in the facial recognition and are provided via a bus system of the vehicle. The image data BD of the camera unit 21 are pre-stored, for example, in the image data buffer memory and are requested from the image data buffer memory. The camera unit 23 is activated, for example, to generate the respective image data BD, and the respective image data BD are requested directly from the camera unit 23.

The respective image data BD of the subset TM are requested, for example, for the time of detection of the fault in the facial recognition.

Following step S109, the processing is continued in a step S111. In step S111, the respective requested image data ABD are assigned to the respective fault entry FE.

Following step S111, the program is continued in a step S113. In step S113, the respective fault entry FE is stored in the fault entry memory 40.

The fault entry memory is, for example, a fault memory of the vehicle which is designed to store the fault memory entry.

Following step S113, the program is continued in a step S115. In step S115, the respective requested image data ABD of the subset TM of the plurality of camera units 21, 23, 25 are stored in the image data memory 50.

The image data memory is, for example, the fault memory. The respective requested image data ABD of the subset TM which comprises the camera units 21, 23 are stored, for example, together with the fault memory entry in the fault memory.

The program is then ended in a step S117 and can be restarted, if necessary, in step S101.

The invention claimed is:

1. A method for fault management for a vehicle having a plurality of camera units configured to provide image data, comprising:
   detecting a respective fault condition in relation to the vehicle, wherein the respective fault condition is one of a plurality of different types of fault conditions in relation to the vehicle;
   responsive to the detection of the respective fault condition in relation to the vehicle, creating a respective fault entry which is representative of information relating to the respective detected fault condition;
   selecting a subset of the plurality of camera units depending on the respective detected fault condition, wherein the selected subset of the plurality of camera units are associated with the respective detected fault condition;
   requesting respective image data of the subset of the plurality of camera units depending on the respective detected fault condition in such a way that the respective image data has a temporal reference to the respective detected fault condition; and
   assigning the respective requested image data to the respective fault entry.

2. The method as claimed in claim 1, wherein requesting the respective image data further comprises requesting the respective image data of the subset of the plurality of camera units from an image data buffer memory depending on the respective detected fault condition, wherein the image data buffer memory has pre-stored image data of the at least one camera unit.

3. The method as claimed in claim 1, wherein requesting the respective image data of the subset of the plurality of camera units includes requesting the respective image data from the at least one camera unit depending on the respective detected fault condition.

4. The method as claimed in claim 1, wherein the respective fault entry is stored in a fault entry memory.

5. The method as claimed in claim 1, wherein the respective requested image data of the subset of the plurality of camera units is stored in an image data memory.

6. The method as claimed in claim 1, wherein the respective image data of the subset of the plurality of camera units is requested from an image data buffer memory depending on the respective detected fault condition, wherein the image data buffer memory has pre-stored image data of the plurality of camera units.

7. The method as claimed in claim 1, wherein requesting the respective image data of the subset of the plurality of camera units includes requesting the respective image data from the subset of the plurality of camera units depending on the respective detected fault condition.

8. A fault management apparatus for a vehicle having a subset of the plurality of camera units configured to provide image data, wherein the fault management apparatus has:
   a fault entry memory configured to store a respective fault entry;
   an image data memory configured to store respective requested image data; and
   wherein the fault management apparatus is configured to carry out the method as claimed in claim 1.

9. The fault management apparatus as claimed in claim 8, wherein the fault management apparatus is further configured to request the respective image data of the subset of the plurality of camera units from an image data buffer memory depending on the respective detected fault condition, wherein the image data buffer memory has pre-stored image data of the plurality of camera units.

10. The fault management apparatus as claimed in claim 8, wherein the respective fault entry is stored in a fault entry memory.

11. The fault management apparatus as claimed in claim 10, wherein the respective requested image data of the subset of the plurality of camera units is stored in the image data memory.

12. One or more non-transitory computer readable media storing instructions that, when executed by a computer, cause the computer to carry out the method as claimed in claim 1 during its execution on a data processing apparatus.

13. The one or more non-transitory computer readable media of claim 12, the instructions that when executed further cause the computer to request the respective image data of the subset of the plurality of camera units from an image data buffer memory depending on the respective detected fault condition, wherein the image data buffer memory has pre-stored image data of the plurality of camera units.

14. The one or more non-transitory computer readable media of claim 12, wherein the respective fault entry is stored in a fault entry memory.

15. One or more non-transitory computer readable media comprising executable program code, wherein the program code, when executed by a data processing apparatus, carries out the method as claimed in claim 1.

16. The one or more non-transitory computer readable media of claim 15, wherein the respective requested image data of the subset of the plurality of camera units is stored in an image data memory.

17. The one or more non-transitory computer readable media of claim 15, wherein the program code, when executed by a data processing apparatus, further causes the data processing apparatus to request the respective image data of the subset of the plurality of camera units from an image data buffer memory depending on the respective detected fault condition, wherein the image data buffer memory has pre-stored image data of the plurality of camera units.

18. The fault management apparatus of claim 8 wherein one of the fault entry memory and the image data memory is located on the vehicle and another one of the fault entry memory and the image data memory is located at a remote location separate from the vehicle.

19. The fault management apparatus of claim 8 wherein the fault entry memory and the image data memory are located together either on the vehicle or at a remote location separate from the vehicle.

* * * * *